United States Patent [19]

Patterson et al.

[11] Patent Number: 5,356,642

[45] Date of Patent: Oct. 18, 1994

[54] PROCESS FOR PREPARING AN ENROBED RICE AND PASTA COMBINATION

[75] Inventors: Patrick J. Patterson, Palatine; Hideo Tomomatsu, Crystal Lake, both of Ill.

[73] Assignee: The Quaker Oats Company, Chicago, Ill.

[21] Appl. No.: 845,887

[22] Filed: Mar. 4, 1992

[51] Int. Cl.⁵ .................... A23L 1/16; A23L 1/182; A23P 1/08

[52] U.S. Cl. ................................ 426/93; 426/293; 426/302; 426/306; 426/451; 426/557

[58] Field of Search .............. 426/302, 306, 293, 557, 426/93, 451

[56] References Cited

U.S. PATENT DOCUMENTS

| | | | |
|---|---|---|---|
| 2,278,465 | 4/1942 | Musher | 426/309 |
| 2,475,133 | 7/1949 | Furter et al. | 426/309 |
| 2,811,447 | 10/1957 | Kamada et al. | 426/309 |
| 3,392,029 | 7/1968 | Nibler et al. | 99/83 |
| 3,652,299 | 3/1972 | Penton | 426/99 |
| 3,753,730 | 8/1973 | Donnarumma et al. | 426/309 |
| 3,879,566 | 4/1975 | Cox et al. | 426/309 |
| 4,767,636 | 8/1988 | Ramos et al. | 426/291 |
| 4,769,247 | 9/1988 | Rothenberg et al. | 426/291 |
| 5,089,284 | 2/1992 | Irvin et al. | 426/557 |

*Primary Examiner*—Donald E. Czaja
*Assistant Examiner*—Mary S. Mims
*Attorney, Agent, or Firm*—Mart C. Matthews; Lars S. Johnson

[57] ABSTRACT

The present invention relates to a process for preparing an enrobed rice and pasta combination product, said process comprising: (a) combining rice and pasta to form a mixture; (b) applying an aqueous composition to said mixture; (c) contacting said mixture with edible coating material to form a coated mixture; and (d) drying said coated mixture. The present invention further comprises a rice and pasta combination product prepared in accordance with the above-described process.

33 Claims, No Drawings

5,356,642

PROCESS FOR PREPARING AN ENROBED RICE AND PASTA COMBINATION

FIELD OF INVENTION

The present invention relates to a process for preparing a rice and pasta combination product which is enrobed with edible coating materials such as herbs, seasonings, spices and other flavoring agents. The present invention also relates to the product of said preparation process.

BACKGROUND OF INVENTION

Rice and pasta combination products, and especially quick-cooking, dried rice and pasta combination products are popular with consumers. This popularity may be attributed to a number of features of these products, including their flavor, convenience, storage stability, ease of preparation, and nutritional properties. Undoubtedly, of these features, flavor is an important element of the popularity of these products, since it is doubtful that most consumers would purchase these products if they had poor taste, no matter how convenient or nutritional. Thus, it is desirable to make these products as flavorful as possible.

Typically these rice and pasta combinations are flavored with herbs, spices, seasonings and other flavoring agents. For these products, it is desirable to have the flavoring agents distributed as uniformly as possible throughout the product, thereby providing a substantially uniform taste sensation to the consumer. This may be accomplished in a number of ways. For example, the flavoring agents can be pre-mixed in a pouch and included in the same package containing the rice and pasta mixture. The rice and pasta mixture can then be heated in boiling water, and the pre-mixed, packaged flavoring agents can be added to the boiling water. The water will act as a vehicle to provide a substantially uniform distribution of the seasoning on the rice and pasta substrate surfaces. A more convenient flavoring method would be to attach the flavoring agents directly to the surface of the rice and pasta. This would obviate the need for the additional step of separately adding the flavoring agents to the cooking medium of the rice and pasta mixture.

However, there are problems associated with the production of rice and pasta combination products having the flavoring agents attached directly to the rice and pasta surfaces. One particular problem is attaching the flavoring agents so only minimal separation from the surfaces occurs during processing, packaging, shipping and handling. Another problem is obtaining a substantially uniform distribution of the flavoring agents on the rice and pasta surfaces. Furthermore, while there are methods of attaching flavoring agents to the surfaces of both the rice and pasta, albeit individually, such methods typically involve the use of fats and/or oils as an attachment aid. This use of fats and/or oils during processing is potentially undesirable for a number of reasons, including the greater health risks of fats and oils as compared to water and the generally recognized unhealthful aspects of such fats and oils when included in products such as those prepared in accordance with the present invention.

The present invention obviates these problems in that it provides an improved method of preparing a rice and pasta combination product enrobed with flavoring agents, including seasonings, herbs and spices, wherein the attachment of the flavoring agents to the product surface is facilitated by water instead of oil or fat, wherein the flavoring agents are attached substantially uniformly to the rice and pasta surfaces, and wherein there is only minimal separation of the flavoring agents from the rice and pasta surfaces.

BACKGROUND ART

The art discloses methods for coating rice and pasta with flavoring agents. A method for allegedly uniformly applying coating materials to rice is disclosed in U.S. Pat. No. 3,392,029, issued Jul. 9, 1968, to Nibler et al. In the Nibler method, rice is coated by first forming a moistened surface of gelatinized rice on dry grains of rice having an equilibrium level of moisture or lower, said moistened surface being provided by adding water to the rice to increase the moisture level to a range of from about 5 percent to about 20 percent of the weight of the rice, said increase in moisture level occurring primarily at the surface of the grains; mixing a substantially dry coating material with the moistened rice; and drying the rice.

U.S. Pat. No. 4,767,636, issued Aug. 30, 1988, to Ramos et al., discloses a method for preparing a non-segregating, free-flowing, dried instant rice and sauce dish in which spices are attached to the rice surface. In the Ramos method, dried instant rice is conveyed to a rotating coating reel. At the coating reel, the rice is coated with, in order, oil, dry sauce-producing ingredients, and a second and third coating of oil.

A continuous process for preparing a non-segregating, free-flowing dried instant pasta and sauce dish in which spices are attached to the pasta surface is taught in U.S. Pat. No. 4,769,247, issued Sept. 6, 1988, to Rothenberg et al. In the Rothenberg method, instant pasta is first preheated and then conveyed to a rotating coating reel, wherein the pasta is tumbled. In the coating reel melted fat is applied to the heated tumbling pasta, after which the fat-coated, heated pasta is contacted with dry sauce-producing ingredients. After being coated with the sauce-producing ingredients, a second and third coating of melted fat is applied to the pasta. The pasta is then cooled for packaging.

However, none of these references teach or suggest a method for enrobing a rice and pasta combination product, with the differing surface properties of these different food substrates, with edible coating materials such as herbs, spices, seasonings, and other flavoring agents.

It is therefore an object of the present invention to provide a process for enrobing a rice and pasta combination product with edible coating material.

It is also an object of the present invention to provide a enrobed rice and pasta combination product prepared in accordance with the method of the present invention.

These and other objectives are accomplished by the invention described herein.

SUMMARY OF THE INVENTION

The present invention relates to a process for producing a rice and pasta combination product, said process comprising: (a) combining rice and pasta to form a mixture; (b) applying an aqueous composition to said mixture; (c) contacting said mixture with an edible coating material to form a coated mixture; and (d) drying said coated mixture.

The present invention further comprises a rice and pasta combination product prepared in accordance with the above-described process.

DETAILED DESCRIPTION OF THE INVENTION

The present invention relates to a process for preparing an enrobed rice and pasta combination product wherein rice and pasta are combined to form a mixture; coated with an aqueous composition; contacted with an edible coating material to form a coated mixture; and dried.

Any type of rice, including raw milled rice, parboiled rice, converted rice, and dried, quick-cooking rice, may be utilized in the present invention. The quick-cooking rice is preferred for its convenience to the consumer. By "quick-cooking" it is meant that the consumer can cook the final product of the present invention in a short period of time, typically by contacting it with heated water having a temperature of at least about 70° C., preferably about 95° C., for a period of time in the range of from about 5 to about 20, preferably from about 5 to about 10 minutes.

The rice may be rendered quick-cooking by any method known to those skilled in the art, with pretreatment being preferred. The pretreatment of the rice may be accomplished by any method known to those skilled in the art, and typically involves some degree of gelatinization of the rice starch, particularly partial or total gelatinization of the surface starch of the rice. Examples of pretreatment methods useful herein include, but are not limited to, water- or steam- cooking followed by drying; hot-air expansion; and dry heat cooking, preferably by radiant heating; with hot-air expansion being preferred. In a preferred embodiment of the present invention, no additional moisture is used to pretreat the rice. The rice is heated, preferably with hot air, under conditions sufficient to partially or totally gelatinize the rice, with the moisture naturally occurring in the rice acting to partially or totally gelatinize the rice starch. Preferably the air used to heat the rice has a temperature in the range of from about 205° C. to about 480° C., more preferably from about 220° C. to about 275° C., and is contacted with the rice for a period of time in the range of from about 10 to about 90, more preferably from about 45 to about 60 seconds.

The pasta utilized in the present invention may either be obtained already prepared from a supplier or may be prepared by any method known to those skilled in the art. Examples of different types of pasta useful in the present invention include, but are not limited to: spaghetti, linguine, pasta shells, fettuccine, vermicelli, rosamaria, pasta elbows, angel hair, mostaccioli, rigatoni, spirals, tubes, bowtie, and lasagna, with cut vermicelli and rosamaria being preferred.

Once prepared, the pasta is also preferably pretreated to make it quick-cooking. As with the rice, the pretreatment of the pasta may be accomplished by any method known to those skilled in the art, and typically involves some degree of gelatinization of the pasta starch, particularly partial or total gelatinization of the surface starch of the pasta. Examples of pretreatment methods useful herein include, but are not limited to, steam- or water- cooking; hot-air cooking/browning; cooking during extrusion and pasta formation; and dry cooking, preferably by radiant heat; with hot-air cooking/browning being preferred. As with the rice, in a preferred embodiment of the present invention no additional moisture is used when pretreating the pasta. The pasta is heated, preferably with hot-air, under conditions sufficient to partially or totally gelatinize the pasta, with the moisture contained in the pasta acting to partially or totally gelatinize the pasta starch. Preferably the air used to heat the pasta has a temperature in the range of from about 205° C. to about 480° C., more preferably from about 220° C. to about 275° C., and is contacted with the pasta for a period of time in the range of from about 10 to about 90, more preferably from about 45 to about 60 seconds.

The rice and pasta may be pretreated either separately or together. When pretreated together, care should be taken not to "overcook", that is to treat significantly beyond the desired degree of gelatinization, either the rice or the pasta. Since rice and pasta usually do not cook at the same rate under the same conditions, this means that the limiting factor will be the first of these to reach its desired gelatinization point, which will depend upon the type of pasta and rice used.

If pretreated together, the rice and pasta are combined prior to pretreatment to form a mixture. If pretreated separately, the rice and pasta are combined following pretreatment to form a mixture. In either case, the rice and pasta may be combined by any means known to those skilled in the art, including, but not limited to, hand mixing, combining the ingredients in a rotating drum, feeding the ingredients separately into a pneumatic conveying system, and mixing the ingredients in a mechanical mixing device, with combining the ingredients in a rotating drum being preferred.

The rice and pasta are preferably mixed under conditions sufficient to achieve significant interdispersion of the ingredients, typically by rotating the ingredients in a drum rotating at about 2 to about 50 RPM, preferably at about 5 to about 30 RPM for a period of time ranging from about 0.5 to about 4, preferably from about 1 to about 2 minutes. If the rice and pasta are significantly gelatinized, care should be taken to avoid damaging their surfaces during mixing due to excessive mechanical force.

The rice and pasta are combined at a weight ratio sufficient to provide for a desired flavor and textural profile for a desired product, preferably at a ratio in the range of from about 20:1 to about 1:20, more preferably from about 8:1 to about 1:8 (rice:pasta) on a dry weight basis.

Following mixing, an aqueous composition is applied to the rice and pasta mixture. The aqueous composition is typically applied at a temperature in the range of from about 5° C. to about 90° C., preferably from about 15° C. to about 35° C., and may be applied by any method known to those skilled in the art. Examples of useful methods include, but are not limited to, spraying and immersion, with spraying being preferred. In a most preferred method, the aqueous composition is sprayed onto the rice and pasta mixture in a drum rotating at a speed in the range of from about 2 RPM to about 50 RPM, preferably from about 5 RPM to about 30 RPM. This provides for a more uniform coating of the aqueous composition on the rice and pasta mixture.

The amount of aqueous composition applied to the mixture is in the range of from about 1% to about 30%, preferably from about 5% to about 12% of the total weight of the rice and pasta mixture and aqueous composition.

The aqueous composition may be pure water or may be a mixture of water and other desirable, edible ingredients. Examples of such ingredients useful herein include, but are not limited to, anti-oxidants, emulsifiers, fats, flavorings, spices and herbs, with anti-oxidants being preferred. In a more preferred mode, the aqueous composition comprises from about 80% to about 99.9%, preferably from about 95% to about 99.7% by weight water and from about 0.01% to about 20%, preferably from about 0.03% to about 5% by weight anti-oxidant. Anti-oxidants useful herein may be any anti-oxidant known to those skilled in the art. When selecting an anti-oxidant, consideration should be given to the effect of the anti-oxidant on the flavor profile of the final rice and pasta combination product. Examples of useful anti-oxidants include, but are not limited to, BHA, BHT, TBHQ, ascorbyl palmitate, ascorbic acid, citric acid, rosemary extract, and tocopherols (vitamin E), with BHT being preferred.

Following application of the aqueous composition, the rice and pasta mixture is contacted with an edible coating material. Edible coating materials useful herein can be any edible coating material, examples of which include, but are not limited to; herbs such as rosemary and thyme; spices such as onion, garlic and salt; seasonings such as soup mixes; other flavoring agents such as cheese and cheese powders, fruit flavors, spice extracts and flavors, and fats; and mixtures thereof; with blends of herbs and spices being preferred.

The rice and pasta mixture and the edible coating material may be contacted by any method known to those skilled in the art. Examples of useful methods include, but are not limited to, delivering the edible coating using a seasoning auger or a rotating disk, entraining the edible coating material in an air stream which is blown onto the rice and pasta mixture, mixing in a mechanical mixing device, mixing in a rotary drum, and mixing on a moving conveying belt surface by vibration, with the seasoning auger being preferred.

The rice and pasta mixture is contacted with the edible coating material for a sufficient period of time to attach a sufficient amount of edible coating material to the rice and pasta surfaces. The precise amount of contacting time necessary will depend upon a number of variables, including the desired flavor profile of the final rice and pasta combination product, the stickiness of the rice and pasta surfaces, the method of contacting the rice and pasta mixture with the edible coating material, etc. The desired contact time will also be dependent upon the type of edible coating material being contacted with the rice and pasta mixture.

In a preferred embodiment, a blend of herbs and spices is applied to the rice and pasta mixture using a seasoning auger while the rice and pasta mixture is rotated in a drum at a speed in the range of from about 2 RPM to about 50 RPM, preferably from about 5 RPM to about 30 RPM. The herb and spice blend and the rice and pasta mixture are contacted in the drum for a period of time sufficient to produce a coated rice and pasta mixture comprising from about 1% to about 40%, preferably from about 6% to about 30% by weight of the herb and spice blend, and from about 99% to about 60%, preferably from about 94% to about 70% by weight of the rice and pasta mixture, based upon the total dry weight of the rice, pasta and herb and spice blend. This time period is typically from about 1 to about 20, preferably from about 3 to about 10 minutes.

Following contacting the rice and pasta mixture with the edible coating material, the coated rice and pasta mixture is dried to a moisture content in the range of from about 3% to about 12%, preferably from about 5% to about 8% by weight.

The drying can be accomplished by any means known to those skilled in the art. Examples of drying methods useful in the present invention include, but are not limited to, forced-air convection dryers, air impingement dryers, microwave dryers, radio-frequency dryers, and direct radiant dryers, with forced-air connection dryers being preferred. In a typical drying operation, the coated rice and pasta mixture is subjected to a temperature ranging from about 40° C. to about 100° C., preferably from about 60° C. to about 90° C., for a period of time in the range of from about 3 to about 20, preferably from about 5 to about 9 minutes. To improve drying and energy efficiency, it is preferred that the coated rice and pasta mixture be spread on an extended surface, such as shallow pans or on a conveyor belt, during drying.

In a preferred embodiment of the process of the present invention, a second aqueous composition is applied to the coated rice and pasta mixture after the mixture is contacted with the edible coating material and before drying. This second aqueous composition is preferably applied at a temperature in the range of from about 5° C. to about 90° C., preferably from about 15° C. to about 35° C.

The second aqueous composition may be identical to the first aqueous composition, or it may be comprise a completely different mixture of water and other desirable, edible ingredients of the type already described herein. In a preferred mode, the second aqueous composition comprises from about 80% to about 99.9%, preferably from about 95% to about 99.7% by weight water and from about 0.01% to about 20%, preferably from about 0.03% to about 5% by weight anti-oxidant. Anti-oxidants useful herein are the same as those already described herein as being useful for the first aqueous composition.

As with the first aqueous composition, the second aqueous composition may be applied to the coated rice and pasta mixture by any method known to those skilled in the art. Examples of useful methods include, but are not limited to, spraying and immersion, with spraying being preferred. In a most preferred method, the second aqueous composition is sprayed onto the coated rice and pasta mixture in a drum rotating at a speed in the range of from about 2 RPM to about 50 RPM, preferably from about 5 RPM to about 30 RPM. This provides for a more uniform coating of the second aqueous composition on the coated rice and pasta mixture.

The amount of second aqueous composition applied to the coated rice and pasta mixture is in the range of from about 1% to about 30%, preferably from about 1% to about 3% of the total weight of the coated rice and pasta mixture and second aqueous composition.

While not intending to be bound by theory, it is unexpected and surprising that the rice and pasta used in the process of the present invention, with their differing surface properties, could be coated in a substantially uniform manner by a single, combined coating step, as described in the present invention. desired flavor profile, and is dependent upon the factors already described herein such as the type of edible coating material used, the desired flavor profile, the ratio of rice to pasta, etc. Typical retention times range from about 1 to about 20, preferably from about 3 to about 10 minutes.

The aqueous composition is sprayed onto the rice and pasta mixture in a manner, including at a temperature and a weight percent, as already described herein.

The edible coating material is applied to the moistened rice and pasta mixture via a seasoning auger, which in essence is a screw in a barrel with holes in the bottom which the coating material falls through onto the rice and pasta mixture. The amount of edible coating material applied to the moistened rice and pasta mixture will depend upon the composition of the mixture, although said amount typically is in the range of from about 1% to about 40%, preferably from about 6% to about 30% by weight, based upon the dry weight of the edible coating material and rice and pasta mixture.

In a more preferred embodiment, a second aqueous composition is applied to the coated rice and pasta mixture. This second aqueous composition is applied to the rice and pasta in the enrober and after the mixture is contacted with the edible coating material and before drying. The second aqueous composition utilized in this preferred embodiment of the present invention is the same as the second aqueous composition already described herein and is applied in the A preferred process in accordance with the present invention comprises: (a) combining quick-cooking rice and quick-cooking pasta to form a mixture; (b) charging said mixture into an enrober; (c) spraying an aqueous, anti-oxidant containing composition onto said mixture in said enrober to form a moistened mixture; (d) applying a blend of herbs and spices onto said moistened mixture using a seasoning auger, thereby forming a coated mixture; (e) discharging said coated mixture from said enrober; and (f) drying said coated mixture.

The rice and pasta are rendered quick-cooking and are combined in accordance with the methods already described herein.

The enrober used herein may be any enrobing device known to those skilled in the art. Examples of enrobing devices useful herein include, but are not limited to, flowthrough coating drums, in/out coating drums, and perforated conveyor belts, with flow-through coating drums being preferred. A most preferred enrobing device comprises a rotating drum which mixes the rice and pasta mixture during the application of the aqueous composition and edible coating material. The enrober rotates at a speed in the range of from about 2 RPM to about 50 RPM, preferably from about 5 RPM to about 30 RPM. The retention time of the rice and pasta in the enrober is that time necessary for sufficiently adhering a sufficient amount of edible coating material to the pasta and rice surfaces to provide for a same manner as already described herein, preferably by spraying.

The present invention further comprises a rice and pasta combination product coated with an edible coating material prepared by the process claimed herein.

The rice, pasta, and edible coating material utilized in the product of the process of the present invention are as already described herein. The product comprises from about 5% to about 95%, preferably from about 12% to about 88% by weight rice, preferably quick-cooking rice; from about 5% to about 95%, preferably from about 12% to about 88% by weight pasta, preferably quick-cooking pasta; from about 1% to about 40%, preferably from about 6% to about 30% by weight edible coating material; and has a moisture content in the range of from about 3% to about 12% preferably from about 5% to about 8% by weight.

Another advantage of this enrobed rice and pasta product is that since the edible coating material is already enrobed directly onto the rice and pasta surface, the consumer may prepare a serving or servings of any size. In contrast, in situations where pre-mixed, packaged flavor agents are combined with rice and pasta by the consumer to prepare coated rice and pasta mixtures, a finite number of servings and sizes must be prepared (e.g., one pre-mixed flavor package serves 6 and must all be made at one time).

The present invention is further illustrated, but not limited by, the following examples.

EXAMPLES

Example 1

Medium-grain rice is hot-air expanded at 245° C. and cooled. The same process and air temperature are used to pre-cook cut vermicelli pasta. Three thousand lbs/hr of the cooled rice and 2,250 lbs/hr of the vermicelli are charged into the entrance of a flow-through enrober (coating drum) rotating at a speed of 10 RPM. In the first section of the drum the dry rice and vermicelli are tumbled and mixed for 2 minutes. In the next section of enrober 3 liters/minute of aqueous solution consisting of 99.5% by weight water and 0.08% by weight BHT are applied onto the product mixture through 7 spray nozzles symmetrically arranged over an 18 inch length of product bed. Starting 6 inches past the last application point of the aqueous solution, 665 lbs/hr of a seasoning mix, consisting of a blend of herbs and spices, is applied to the wetted rice and vermicelli. The mixture is tumbled for 3 minutes. Just past the seasoning application point, 2 nozzles apply 0.75 liter/minute of the same aqueous solution as applied prior to the seasoning. The mixture tumbles for 1 additional minute.

The wet product is distributed onto a perforated dryer belt at a depth of 1". The coated rice and vermicelli are dried for 7 minutes at 160° F.

Example 2

Long-grain rice is hot-air expanded at 245° C. for 50 seconds and cooled. Rosamaria pasta is toasted for the same length of time at 230° C. and cooled. Four thousand one hundred seventy two lbs/hr of the cooled rice and 1,075 lbs/hr of the rosamaria are charged into the entrance of a flow-through enrober (coating drum) rotating at a speed of 10 RPM. In the first section of the drum the dry rice and rosamaria are tumbled and mixed for 2 minutes. In the next section of enrober 3 liters/minute of aqueous solution consisting of 99.5% by weight water and 0.05% by weight BHT are applied onto the product mixture through 7 spray nozzles symmetrically arranged over an 18 inch length of product bed. Starting 6 inches past the last application point of the aqueous solution, 487 lbs/hr of a seasoning mix, consisting of a blend of herbs and spices, is applied to the wetted rice and rosamaria using an entraining airflow rate of 350 standard cubic feet per minute. The coated product is tumbled for 4 minutes. Just past the seasoning application point, 1 spray nozzle applies 0.75 liter/minute of the same aqueous solution as applied prior to the seasoning. The mixture tumbles for 1 additional minute.

The wet product is dried for 5 minutes at 210° F. at a bed depth of ¾".

EXAMPLE 3

Parboiled long-grain instant rice is purchased for use with the present process. Rosamaria pasta is toasted for 1 minute at 245° C. Four thousand two hundred lbs/hr of the cooled rice and 1,050 lbs/hr of the rosamaria are charged into the entrance of a flow-through enrober (coating drum) rotating at a speed of 16 RPM. In the first section of the drum the dry rice and rosamaria are tumbled and mixed for 2 minutes. In the next section of enrober 3.5 liters per minute of aqueous solution consisting of 99.5% by weight water and 0.08% by weight BHT are applied onto the product mixture through 4 spray nozzles symmetrically arranged over a 24 inch length of product bed. Starting 6 inches past the last application point of the aqueous solution, 420 lbs/hr of a seasoning mix, consisting of a blend of herbs and spices, is applied to the wetted rice and rosamaria over a 36" length of product bed by means of a feeder auger and perforated barrel. The coated product is tumbled for 4 minutes, with 2 minutes of additional mixing in the enrober after the seasoning application zone.

The wet product is dried for 10 minutes at 140° F.

Example 4

Medium-grain rice and vermicelli pasta are hot-air expanded at the same time, in the same dryer, at 245° C. for 55 seconds. Three thousand lbs/hr of the cooled rice and 2,223 lbs/hr of the vermicelli are charged into the entrance of a flow-through enrober (coating drum) rotating at a speed of 10 RPM. In the first section of the drum the dry rice and vermicelli are tumbled and mixed for 2 minutes. In the next section of enrober 5 liters per minute of an aqueous solution consisting of 99.7% by weight water and 0.035% by weight BHT are applied onto the product mixture through 7 spray nozzles symmetrically arranged over a 36 inch length of product bed. Starting 12 inches past the last application point of the aqueous solution, 1,575 lbs/hr of a seasoning mix, consisting of cheese powders, dehydrated vegetables, sliced nuts, and spices, is applied to the wetted rice and vermicelli over a 42" length of product bed. The application times of the aqueous solution and seasoning mixture are, respectively, 1 minute and 2 minutes. The coated product is sprayed with an additional 1 liter/minute of the same aqueous solution described above just past the end of the seasoning application. This is followed by 6 more minutes of tumbling/mixing time.

The wet product is dried for 16 minutes at 160° F. at a dryer bed depth of ¾".

Example 5

Medium-grain brown rice is hot-air expanded at 295° C. for 45 seconds. Instantized macaroni shell pasta is purchased. Four hundred fifty lbs/hr of rice and 335 lbs/hr of shells are fed to a flow-through coating reel and is mixed for 1 minute. Four tenths of a liter per minute of an aqueous solution consisting of 99.5% by weight water and 0.08% by weight BHT are applied onto the product through 1 spray nozzle over a 6 inch length of product bed. Starting 6 inches past the last application point of the aqueous solution, 100 lbs/hr of a seasoning mix, consisting of herbs and spices, is applied to the wetted rice and macaroni over a 4" length of product bed. A 3" diameter pipe pneumatically conveys the seasoning into the enrober and onto the rice/pasta surface. The seasoning is entrained in a high velocity air stream that has a volumetric flow rate of 40 standard cubic feet/minute. One foot past the seasoning application point, 0.1 liter/minute of the aqueous solution is applied to the mixture. Mixing time, including seasoning application time, is 5 minutes at an enrober RPM of 22.

The wet mixture is dried for 10 minutes at 130° F. at a bed depth in the dryer of ¾".

What is claimed is:

1. A rice and pasta combination product prepared by: (a) combining from about 5% to about 95% by weight quick-cooking rice and from about 5% to about 95% by weight quick-cooking pasta to form a mixture; (b) applying an aqueous composition to said mixture; (c) contacting said mixture with from about 1% to about 40% by weight edible coating material to form a coated mixture; and (d) drying said coated mixture to a moisture content in the range of from about 3% to about 12% by weight.

2. A process according to claim 1 wherein the weight ratio of rice to pasta is within the range of from about 20:1 to about 1:20 (rice:pasta) and the rice and pasta are quick-cooking.

3. A process according to claim 2 wherein the rice is rendered quick-cooking by contacting the rice with heated air under conditions sufficient to partially gelatinize the rice.

4. A process according to claim 2 wherein the rice is rendered quick-cooking by being contacted with heated air at a temperature in the range of from about 205° C. to about 480° C. for a period of time in the range of from about 10 to about 90 seconds.

5. A process according to claim 3 wherein the pasta is rendered quick-cooking by contacting the pasta with heated air under conditions sufficient to partially gelatinize the pasta.

6. A process according to claim 4 wherein the pasta is rendered quick-cooking by being contacted with heated air at a temperature in the range of from about 205° C. to about 480° C. for a period of time in the range of from about 10 to about 90 seconds.

7. A process according to claim 5 wherein the rice and pasta are combined in step (a) in a rotating drum.

8. A process according to claim 6 wherein the rice and pasta are combined in step (a) in a rotating drum rotating at a speed in the range of from about 2 RPM to about 50 RPM for a period of time ranging from about 0.5 to about 4 minutes.

9. A process according to claim 8 wherein the amount of aqueous composition applied to the rice and pasta mixture is in the range of from about 1% to about 30% by weight of the rice and pasta mixture and aqueous composition.

10. A process according to claim 9 wherein the aqueous composition comprises from about 80% to about 99.9% by weight water and from about 0.01% to about 20% by weight anti-oxidant.

11. A process according to claim 10 wherein the anti-oxidant is selected from the group consisting of BHA, BHT, TBHQ, ascorbyl palmitate, ascorbic acid, citric acid, rosemary extract and tocopherols.

12. A process according to claim 11 wherein the anti-oxidant is BHT.

13. A process according to claim 11 wherein the edible coating material is selected from the group consisting of herbs, spices, seasonings, other flavoring agents, and mixtures thereof.

14. A process according to claim 13 wherein the edible coating material is a blend of herbs and spices.

15. A process according to claim 14 wherein the edible coating material is contacted with the rice and pasta mixture for a period of time sufficient to produce a coated rice and pasta mixture which comprises from about 1% to about 40% by weight of the herb and spice blend, and from about 60% to about 99%, by weight of the rice and pasta mixture, based upon the total dry weight of the rice, pasta and herb and spice blend.

16. A process according to claim 15 wherein the herb and spice blend is contacted with the rice and pasta mixture for a period of time in the range of from about 1 to about 20 minutes.

17. A process according to claim 14 wherein the coated mixture is coated with a second aqueous composition.

18. A process according to claim 17 wherein the amount of second aqueous composition applied to the coated mixture is in the range of from about 1% to about 30% by weight of the coated mixture and second aqueous composition.

19. A process according to claim 18 wherein the second aqueous composition comprises from about 80% to about 99.9% by weight water and from about 0.01% to about 20% by weight anti-oxidant.

20. A process according to claim 16 wherein the coated mixture is dried at a temperature in the range of from about 40° C. to about 100° C. for a period of time in the range of from about 3 to about 20 minutes.

21. A process according to claim 19 wherein the coated mixture is dried at a temperature in the range of from about 40° C. to about 100° C. for a period of time in the range of from about 3 to about 20 minutes.

22. A process for preparing a rice and pasta combination produce, said process comprising: (a) combining quick-cooking rice and quick-cooking pasta to form a mixture; (b) charging said mixture into an enrober; (c) spraying an aqueous, anti-oxidant containing composition onto said mixture in said enrober to form a moistened mixture; (d) applying a blend of herbs and spices onto said moistened mixture using a seasoning auger, thereby forming a coated mixture; (e) discharging said coated mixture from said enrober; and (f) drying said coated mixture.

23. A process according to claim 22 wherein the weight ratio of rice to pasta is within the range of from about 20:1 to about 1:20 (rice:pasta).

24. A process according to claim 23 wherein the rice and pasta are combined in step (a) in a rotating drum.

25. A process according to claim 24 wherein the enrober comprises a rotating drum rotating at a speed in the range of from about 2 RPM to about 50 RPM.

26. A process according to claim 25 wherein the rice and pasta are mixed in the enrober for a period of time in the range of from about 0.5 to about 4 minutes.

27. A process according to claim 26 wherein the amount of aqueous composition applied to the rice and pasta mixture is in the range of from about 1% to about 30% by weight of the rice and pasta mixture and aqueous composition.

28. A process according to claim 27 wherein the aqueous composition comprises from about 80% to about 99.9% by weight water and from about 0.01% to about 20% by weight anti-oxidant.

29. A process according to claim 28 wherein the anti-oxidant is BHT.

30. A process according to claim 29 wherein the amount of herb and spice blend applied to the moistened rice and pasta mixture is in the range of from about 1% to about 40% by weight, based upon the dry weight of the rice and pasta mixture.

31. A rice and pasta combination product prepared by: (a) combining rice and pasta to form a mixture; (b) applying an aqueous composition to said mixture; (c) contacting said mixture with edible coating material to form a coated mixture; and (d) drying said coated mixture.

32. A process according to claim 31 wherein the edible coating material is selected from the group consisting of herbs, spices, seasonings, other flavoring agents, and mixtures thereof.

33. A process according to claim 32 wherein the edible coating material is a blend of herbs and spices.

* * * * *